(12) United States Patent
Yilmaz (10) Patent No.: US 7,383,613 B2
(45) Date of Patent: Jun. 10, 2008

(54) DOOR POSITIONER

(75) Inventor: Mehmet Yilmaz, Heilbronn (DE)

(73) Assignee: Eisenmann Anlagenbau GmbH & Co. KG, Boeblingen (DE)

( * ) Notice: Subject to any disclaimer, the term of this patent is extended or adjusted under 35 U.S.C. 154(b) by 0 days.

(21) Appl. No.: 11/338,593

(22) Filed: Jan. 24, 2006

(65) Prior Publication Data

US 2006/0272099 A1 Dec. 7, 2006

Related U.S. Application Data

(63) Continuation of application No. PCT/EP2005/003437, filed on Apr. 1, 2005.

(30) Foreign Application Priority Data

Apr. 1, 2004 (DE) .................. 20 2004 005 393 U (51) Int. Cl.
*E05F 5/02* (2006.01)
(52) U.S. Cl. .......................................................... 16/82
(58) Field of Classification Search ............... 16/82, 16/83, 371, 374, 377, 86 R, 86 A, 86 B, DIG. 7; 292/262, 263, 265, 267–270, 288, 339, DIG. 17; 118/500, 503; 29/423, 424, 458, 460; 269/281–284, 269/237, 239

See application file for complete search history.

(56) References Cited

U.S. PATENT DOCUMENTS 4,593,946 A * 6/1986 Rich ........................... 292/288

| | | | | |
|---|---|---|---|---|
| 6,248,172 | B1 * | 6/2001 | Shirotani et al. | ............ 118/500 |
| 6,334,236 | B1 * | 1/2002 | Kalliomaki | ................... 16/334 |
| 6,398,871 | B1 * | 6/2002 | Hur | ............................ 118/323 |

FOREIGN PATENT DOCUMENTS

| DE | 4140639 A1 * | 1/1993 |
|---|---|---|
| EP | 545797 A1 * | 6/1993 |
| FR | 2889227 A1 * | 2/2007 |

(Continued)

OTHER PUBLICATIONS

PCT Notification of Transmittal of Copies of Translation of the International Preliminary Report on Patentability (ch 1 or ch 2 of the PCT).

(Continued)

*Primary Examiner*—Chuck Y. Mah
(74) *Attorney, Agent, or Firm*—Factor & Lake, Ltd.

(57) ABSTRACT

A door positioner for holding open a side door of a vehicle body, in particular during a surface treatment of the vehicle body, includes a U-shaped bracket with a first limb, a second limb and a connecting element connecting the two limbs. The two limbs are deflectable elastically against one another in a shear plane. Arranged at the free end of the first limb is a fastening piece for the detachable fastening of the door positioner on an inner surface of the side door. Provided at the free end of the second limb is an actuating part for deflecting the second limb relative to the first limb. Located on the second limb between the connecting element and the actuating part is a fixing means for spring locking of the door positioner on a door spar of the vehicle body.

10 Claims, 6 Drawing Sheets

FOREIGN PATENT DOCUMENTS

| | | | | |
|---|---|---|---|---|
| JP | 03135475 | | | 6/1991 |
| JP | 06254474 | | | 9/1994 |
| JP | 09206644 | A | * | 8/1997 |
| JP | 11188305 | | | 7/1999 |
| JP | 2004113872 | A | * | 4/2004 |

OTHER PUBLICATIONS

PCT International Preliminary Report on Patentability.
PCT Written Opinion of the International Searching Authority.
Patent abstract of Japanese Publication No. 06254474 A.
Patent abstract of Japanese Publication No. 03135475 A.
Patent abstract of Japanese Publication No. 11188305 A.
International Application No. PCT/EP2005/003437 along with search report.
Written Opinion of International Application No. PCT/EP2005/003437.
International Search Report of PCT/EP2003/006794.

* cited by examiner

DOOR POSITIONER

CROSS-REFERENCE TO RELATED APPLICATIONS

This application is a continuation of International Application PCT/EP2005/003437, with an international filing date of Apr. 1, 2005 and claiming priority of German Utility Model DE 20 2004 005 393.4 filed Apr. 1, 2004. The full disclosure of both earlier applications is incorporated herein by reference.

BACKGROUND OF THE INVENTION

1. Field of the Invention

The invention relates to a door positioner for holding open a side door of a vehicle body, in particular during a surface treatment of the vehicle body.

2. Description of Related Art

In the production of vehicles, a body shell is first produced from individual parts. This is then treated in a surface treatment plant in different ways, e.g. by applying paints and other coatings. Generally the body shell is immersed in this process in immersion baths and rotated and/or moved in a translatory manner therein.

During the immersion process the side doors of the body shell should be slightly opened, so that all parts of the side doors and the door surrounds can be treated uniformly. An open position of the side doors is also favorable so that paints and other liquids can drain from the body shell more easily.

If a body shell with opened side doors is moved in an immersion bath, the dynamic pressures caused by the movement could lead to the side doors closing again or opening too far. To prevent this, door positioners are used, which hold the slightly opened side doors in a defined open position in the immersion baths and frequently also during processing in other processing stations.

Known door positioners basically comprise an L-shaped angle with a short limb and a long limb. The free end of the short limb bears a fastening piece, via which the door positioner can be screwed or otherwise fastened detachably to the inside of the side door. At the other end the short limb is connected via a leaf spring to the long limb, which in the fitted state extends into the interior of the body shell.

Arranged laterally on the long limb is a retaining notch, which in the open position of the side door engages in a rebate of the vertical door spar. Arranged at the free end of the long limb is an actuating part, with which the long limb can be swung out against the resistance of the leaf spring in a horizontal plane a few degrees from its resting position. Due to horizontal swinging of the long limb the retaining notch can be brought into engagement with the rebate of the door spar, in order to fix the side door in the open position. By renewed actuation of the actuating part this fixing can be released again, so that the side door can be closed or completely opened.

On the known door positioner the actuating part is situated relatively far in the interior of the body shell. If a robot is to be used for opening and closing the side door, this must reach with one robot arm relatively far into the interior of the body shell to be able to operate the actuating part. This is disadvantageous insofar as paint traces and other particles, which have settled on the robot arm, can detach themselves from this and fall down onto the door sill when the robot arm reaches into the body shell. Since the door sill is not generally clad on motor vehicles, such contaminations can result in expensive extra work on the body shell to guarantee an aesthetically perfect appearance.

SUMMARY OF THE INVENTION

The object of the invention is therefore to specify a door positioner with which contamination of the door sill, in particular in automatic operation of the door positioner, can be prevented.

This object is achieved by a door positioner comprising:

a U-shaped bracket, which has a first limb, a second limb and a connecting element connecting the two limbs, the two limbs being deflectable elastically against one another in a shear plane, a fastening piece arranged at the free end of the first limb for the detachable fastening of the door positioner on an inner surface of the side door, an actuating part arranged at the free end of the second limb, with which part the second limb can be deflected compared with the first limb, and with a fixing means arranged on the second limb between the connecting element and the actuating part for spring locking of the door positioner on a door spar of the vehicle body.

Due to the use of a U-shaped bracket instead of an L-shaped arrangement of two limbs it becomes possible to move the actuating part away from the interior of the body shell to the vicinity of the side door. In particular, in a resting position of the door positioner, in which the limbs are not deflected, the actuating part can lie approximately opposite the fastening piece.

If the actuating part is now grasped manually or with the aid of the robot arm, paint traces and other articles that detach themselves from the robot arm or the actuating part can no longer fall onto the door sill. Rather such particles are deposited on the inner surface of the side door, which is later covered by trim elements and thus no longer visible.

Since the actuating part is arranged at the free end of the second limb, the forces required to deflect the limbs are small on account of the long lever arm.

The use of a U-shaped bracket also has the advantage that if a dynamic pressure acts from inside on the side door fixed in the open position, the second limb with the fixing means is deflected even more strongly towards the door spar. In the case of the majority of fixing means considered, this leads to the fixing becoming even firmer. With the conventional L-shaped arrangements of the limbs, a pressure acting from inside the body shell on the side door, on the other hand, results in the limb, which bears the retaining notch engaging in the door rebate, being moved away from the door rebate, due to which the locking is released and the side door can swing far out. Such a side door swinging far out can strike e.g. a side wall of the immersion bath, which can lead to damage to the side door and/or the wall.

On the other hand, the particularly secure locking of the door positioner with the door spar permits the bracket to be designed such that to deflect the limbs relatively small forces are sufficient. This is particularly advantageous if the door positioner is to be actuatable manually.

The actuating part can be a ring joined to the second limb, the diameter of which ring is matched to an actuating cone of a robot arm. An actuating cone of this kind tends to be used on robot arms, as the cone centers itself in the ring, so that the robot arm needs to be positioned less accurately relative to the body shell.

It is generally most favorable if the actuating cone can be inserted into the ring from above. In relation to the shear plane, in which the limbs are deflected and which in general will run basically horizontally in the installed state of the door positioner, the ring should then enclose an angle of less than 25° and preferably of less than 5°.

For the shearing action of the two limbs of the bracket there are two options. On the one hand, the bracket plane, in which the two limbs are arranged in their resting position, can coincide with the shear plane. Expressed in another way, the limbs of the U-shaped bracket remain in the bracket plane even on deflection.

Admittedly it is even more favourable if the two limbs are arranged in their resting position in a plane that runs perpendicular to the shear plane. In the installation position on the side door the limbs then lie in a vertical plane above one another. This is favourable because the fastening point for the fastening piece should lie lower than the actuating part, which is fastened to the opposing limb and must be easily accessible from outside.

The deflectability of the two limbs can be guaranteed in that one or more parts of the bracket, i.e. the two limbs and the connecting piece, have elastic properties. A deflectability of the limbs can be achieved most easily if these are rigid and only the connecting piece is elastically bendable.

The two limbs and the connecting piece can also be formed, however, in a single piece from an elastic material. The deflectability of the limbs is then determined by the cross-section of the material and its elastic properties.

The fixing means, with which the door positioner can catch on the door spar of the vehicle body, comprises a recess in the simplest case, in which recess a protruding part of the door spar, for example a rebate, can engage. The recess can be formed such that it tightly encloses the rebate in the manner of a retaining notch, so that the door positioner can be fixed on the door rebate with little play.

Preferably at least one projection is formed on an inner surface of the recess in such a way that the rebate or a similar part of the door spar can touch the projection only at one point or along one line. Due to such a point- or line-like contact between the door positioner and the door spar, it is achieved that only very small quantities of paints or other coatings can be deposited on the door positioner. The risk that such deposits detach themselves again from the door positioner and result in contaminations of other parts of the body shell on falling is accordingly small.

Generally it is expedient if the door positioner facilitates locking of the side door in a closed position or almost closed position. For this purpose a fixed counterpart deflectable together with the second limb can be arranged on the second limb between the fixing means and the actuating part, which counterpart interacts with a locking element, which is arranged on the first limb and extends outwards from the first limb in the shear plane, such that the door spar or a part thereof is clamped in a closed position of the side door between the locking element and the counterpart.

BRIEF DESCRIPTION OF THE DRAWINGS

Further features and advantages of the invention result from the following description of a practical example with reference to the drawing. In this.

DESCRIPTION OF PREFERRED EMBODIMENTS

Figure 1:
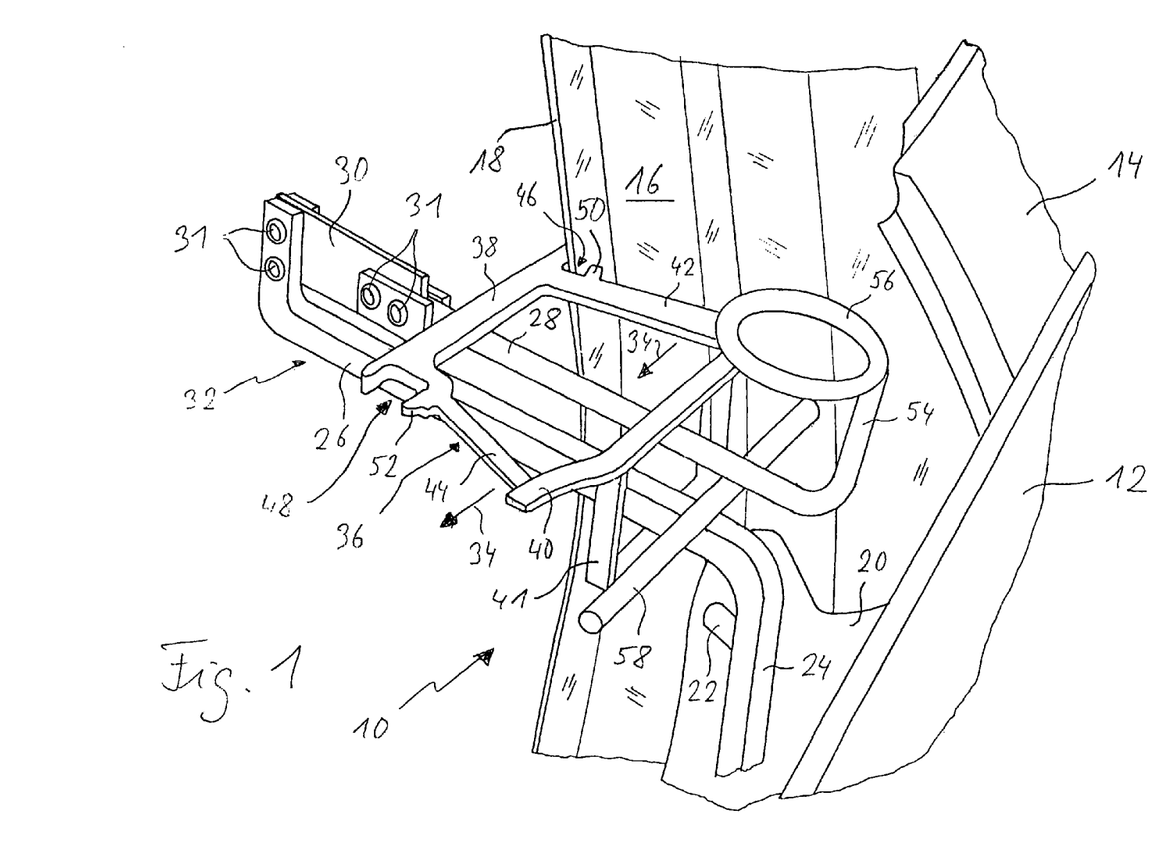
FIG. 1 shows a view in perspective of a door positioner according to the invention according to a first practical example of the invention in the assembled state.

FIG. 1 shows in a view in perspective a door positioner designated 10 overall as well as parts of a body shell of a car. These parts in detail are a front left side door 12, which is slightly opened, a left rear side door 14 and a door spar 16 running approximately vertically with a rebate 18 pointing forwards.

Formed on the front left side door 12 is an inner tongue 20, to which a door lock is attached in final assembly of the car. For this purpose the inner tongue 20 has a hole, which is used however prior to final assembly for the detachable fastening of the door positioner 10. The details of the fastening depend on the design details of the body shell and for this reason are not shown in greater detail in FIG. 1. In the case of the door positioner 10 it is assumed that a fastening bolt 22 of the door positioner 10 is screwed to the inner tongue 20.

The fastening bolt 22 is welded onto a bent section 24 of a first limb 26, which together with a second limb 28 and a leaf spring 30 connecting the two limbs 26, 28 forms a U-shaped bracket 32. In the assembly position of the door positioner 10 shown in FIG. 1, the two limbs 26, 28 are basically arranged vertically above one another, so that a bracket plane determined by the bracket 32 likewise runs vertically. The leaf spring connected via rivets 31 to the limbs 26, 28 facilitates a deflection of the second limb 28 in a shear plane that runs in the assembly state basically horizontally and thus perpendicular to the bracket plane. The deflectability of the second limb 28 relative to the first limb 26 is indicated in FIG. 1 by arrows 34.

Welded on the second limb 28 is a fixing frame 36, which extends in a plane parallel to the shear plane and is formed by a rear cross brace 38, a front cross brace 40, a left longitudinal brace 42 and a right longitudinal brace 44. The fixing frame 36 is manufactured in a single piece by laser welding from a steel plate and—like the door positioner 10 as a whole—is formed in mirror symmetry to the bracket plane. Due to this formation in mirror symmetry the door positioner 10 can be used not only for positioning the left front side door 12, but also for positioning the right front side door.

Welded on below the front cross brace 40 is a swing limiting bracket 41, which encloses the first limb 26 and in this way limits the deflection of the second limb 28 relative to the first limb 26.

Formed laterally on the fixing frame 36 are a left and a right index notch 46 and 48 respectively, the shape of which is matched to the geometry of the rebate 18 of the door spar 16. In the practical example shown, the index notches 46, 48 are formed by the rear cross brace 38 on the one hand and projections 50, 52 on the other hand, which are formed on the longitudinal braces 42 and 44 at a distance from the rear cross brace 38.

Welded on a section 54 of the second limb 28 bent upwards is an actuating ring 56, which extends in a ring plane running parallel to the shear plane. Welded on the upperside of the first limb 26 is a locking rod 58, which is roughly the length of the front cross brace 40, but is located somewhat closer to the actuating ring 56.

It goes without saying that the parts of the door positioner explained above can be joined to one another not by welding but also in another way, e.g. by screwing or riveting.

The door positioner 10 functions as follows:

Following assembly of the body shell, the door positioner 10 is screwed with the aid of the fastening bolt 22 to the front left side door 12. The first limb 26 pointing downwards in the assembly position is joined in this way rigidly to the side door 12. To hold the side door 12 in a defined open position for subsequent treatments in a surface treatment plant, the actuating ring 56 is grasped and pressed away from the door spar 16. The second limb 28 is thereby deflected via the leaf spring 30 compared with the first limb 26 in the direction of the arrows 34. The side door 12 is now opened so far that the left index notch 46 is opposite the rebate 18. The actuating ring 56 is now released again, due to which the second limb 28 with the fixing frame 36 attached to it springs back again into the original resting position.

The left index notch 46 engages in this case with the rebate 18. The side door 12 is now fixed in a defined open position via the door positioner 10 relative to the rebate 18 of the door spar 16.

To transfer the side door 12 to the closed position again, the actuating ring 56 is deflected once again in the direction of the arrows 34, due to which the left index notch 46 is removed from the rebate 18 again. The side door 12 can now either be opened wide, in order to be able to carry out work for example on the inner surface of the side door 12, or it is transferred to a completely or virtually closed position.

To fix the side door 12 in a (virtually) closed position, the second limb 28 is deflected via the actuating ring 56 and the side door 12 closed so far that the rebate 18 can lock between the front edge of the front cross brace 40 on the one hand and the locking rod 58 if the second limb 28 springs back again. In this way the side door 12 is again—but now in a (virtually) closed position—fixed compared with the rebate 18 and can only be opened by renewed deflection of the actuating ring 56.

The actuating ring 56 is not only suitable for manual actuation, but also permits actuation by a robot arm. As a handling tool the robot arm preferably has a cone, which can be inserted into the actuating ring 56. The cone centres itself automatically in the actuating ring 56 in this process, so that the robot arm can actuate the door positioner 10 even if the robot arm is not positioned exactly relative to the body shell.

The U-shaped form of the bracket 32 results in the actuating ring 56 being arranged at least approximately above the fastening bolt 22, which for its part is located in the assembly state over the inner surface of the side door 12. Paint traces or other particles that detach themselves from the actuating ring 56 and/or a robot arm when the actuating ring 56 is actuated thus fall onto the inside of the side door 12. Since the inside of the side door 12 is normally clad later, such contaminations do not spoil this. Soiling of the door sill, which is not generally clad, is thus reliably excluded.

If the side door 12 is pulled outwards in the open position, e.g. as a result of a dynamic pressure in an immersion bath, the forces acting via the bracket 32 on the left index notch 46 result in the second limb 28 being deflected slightly towards the door spar 16. In this way the index notch 46 wedges even more strongly with the rebate 18, so that an unintentional opening of the side door 12 is reliably avoided.

Figure 2:
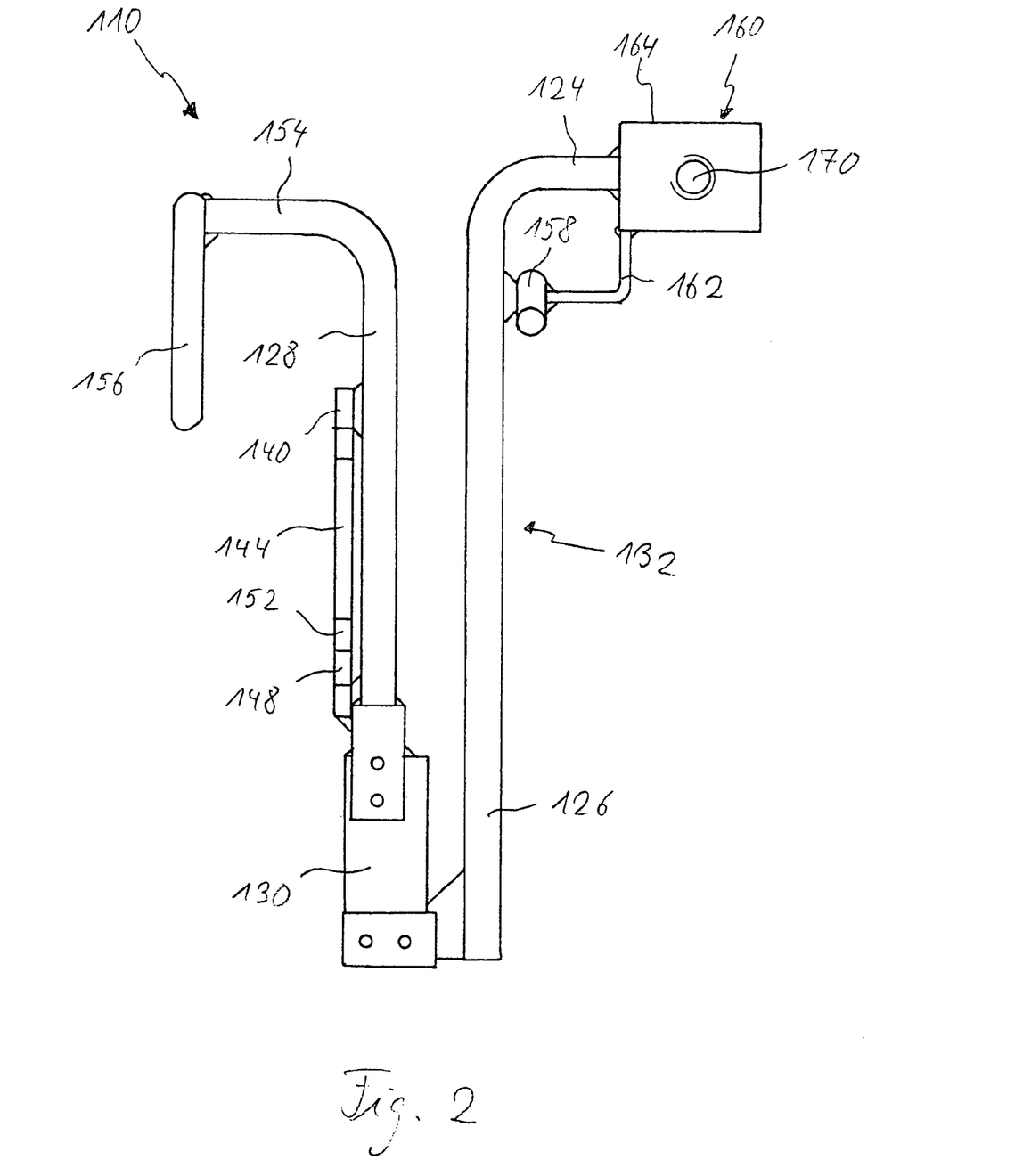
FIG. 2 shows a side view of a door positioner according to the invention according to a second practical example of the invention.
Figure 3:
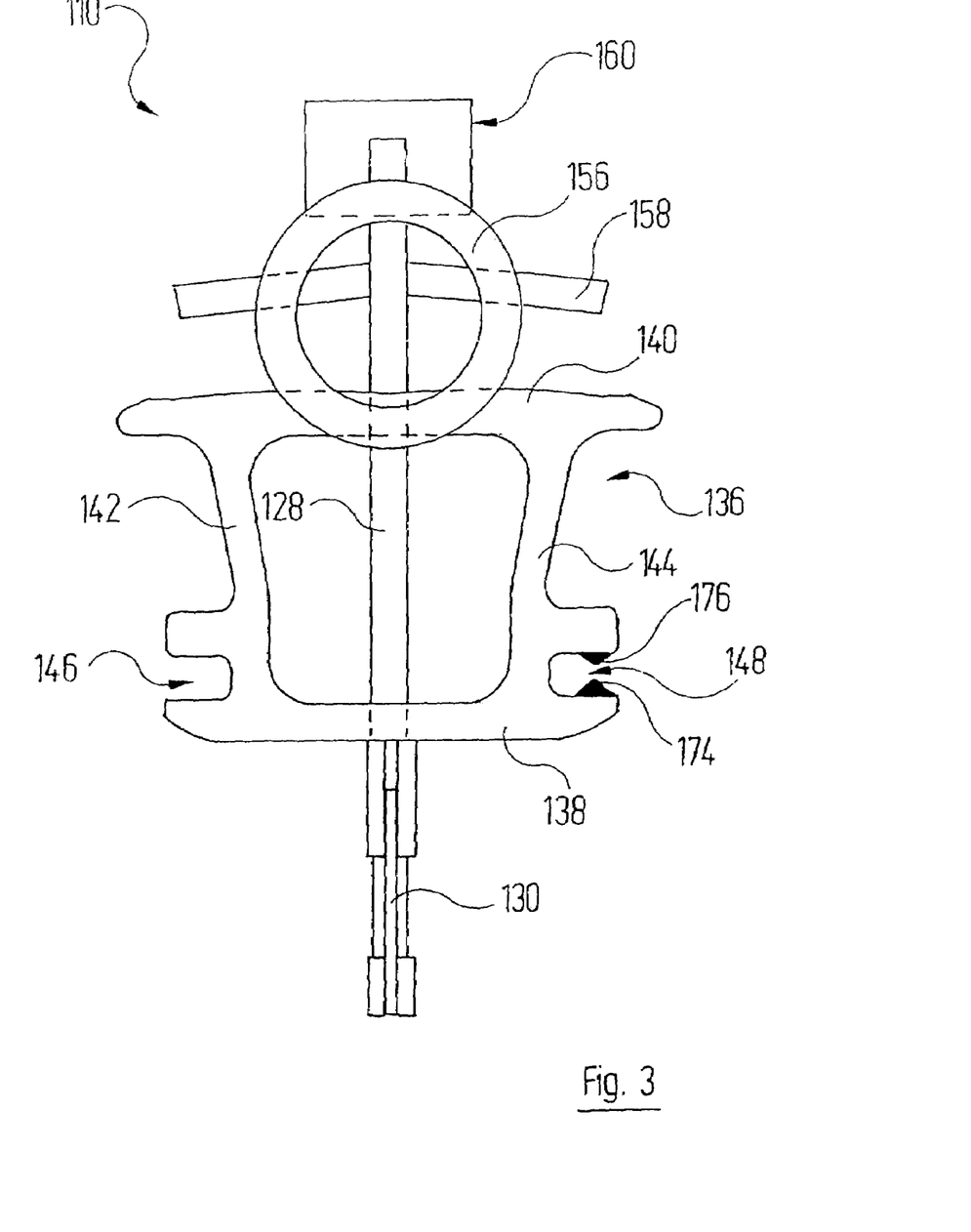
FIG. 3 shows a top view of the door positioner from FIG. 2.
Figure 4:
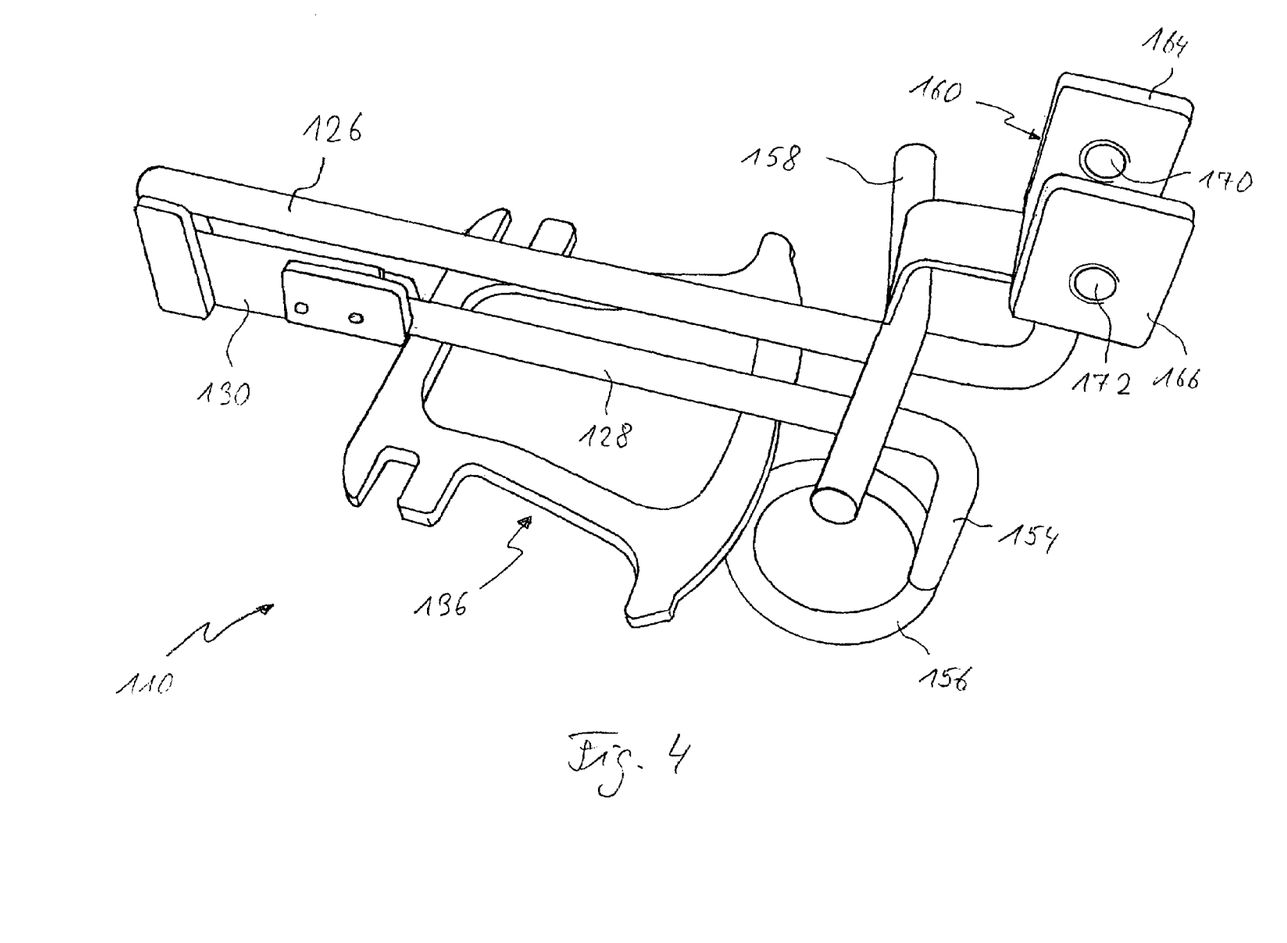
FIG. 4 shows a view in perspective of the door positioner from FIG. 2 from underneath.

FIGS. 2 to 4 show another practical example of a door positioner in a side view, a top view and a view in perspective from obliquely underneath. Identical or corresponding parts here are designated by numbers increased by 100 and are not explained again.

The door positioner designed 110 overall differs from the door positioner 10 in that a fastening stirrup 160 instead of a fastening bolt 22 is welded on the bent section 124 of the first limb 126, which stirrup is supported via a stabilizing plate 162 on the locking rod 158. Two parallel limbs 164, 166 of the fastening stirrup 160 are provided with coaxial holes 170 and 172, which are used to take up a fastening screw. The fastening stirrup 160 is dimensioned in this case such that between the limbs 164, 166 a projection provided with a through hole can be taken up, which projection is formed on the inner surface of the side door 12.

Apart from this, the door positioner 110 shown in FIGS. 2 to 4 has no swing limiting bracket 41.

So that the index notches 146, 148 lie as much as possible in point form adjacent to the rebate 18, projections 174, 176 in the form of a truncated cone can be formed on the inner surface of the index notches 146, 148, as is shown by way of example in FIG. 3 for the right index notch 148. Instead of projections 174, 176 in the form of a truncated cone, ribs extending perpendicular to the plane of the paper in FIG. 3 of e.g. triangular cross-section can be provided on the inner surfaces of the index notches 146, 148, which ribs can be fabricated more easily than projections 174, 176 in the form of a truncated cone. The rebate 18 then only lies along the edges projecting inwards of the ribs on the fixing frame 136.

A solely point- or line-like contact between the fixing frame 136 and the rebate 18 has the advantage that the door positioner 110 removes less material from the surface of the rebate 18. This is favourable even if the surface of the rebate 18 should no longer be visible later. It is namely prevented that material remains sticking unnecessarily to the door positioner 110, which clogs the index notches 146, 148 or soils other parts of the body shell if it detaches itself again from the index notches 146, 148.

Figure 5:
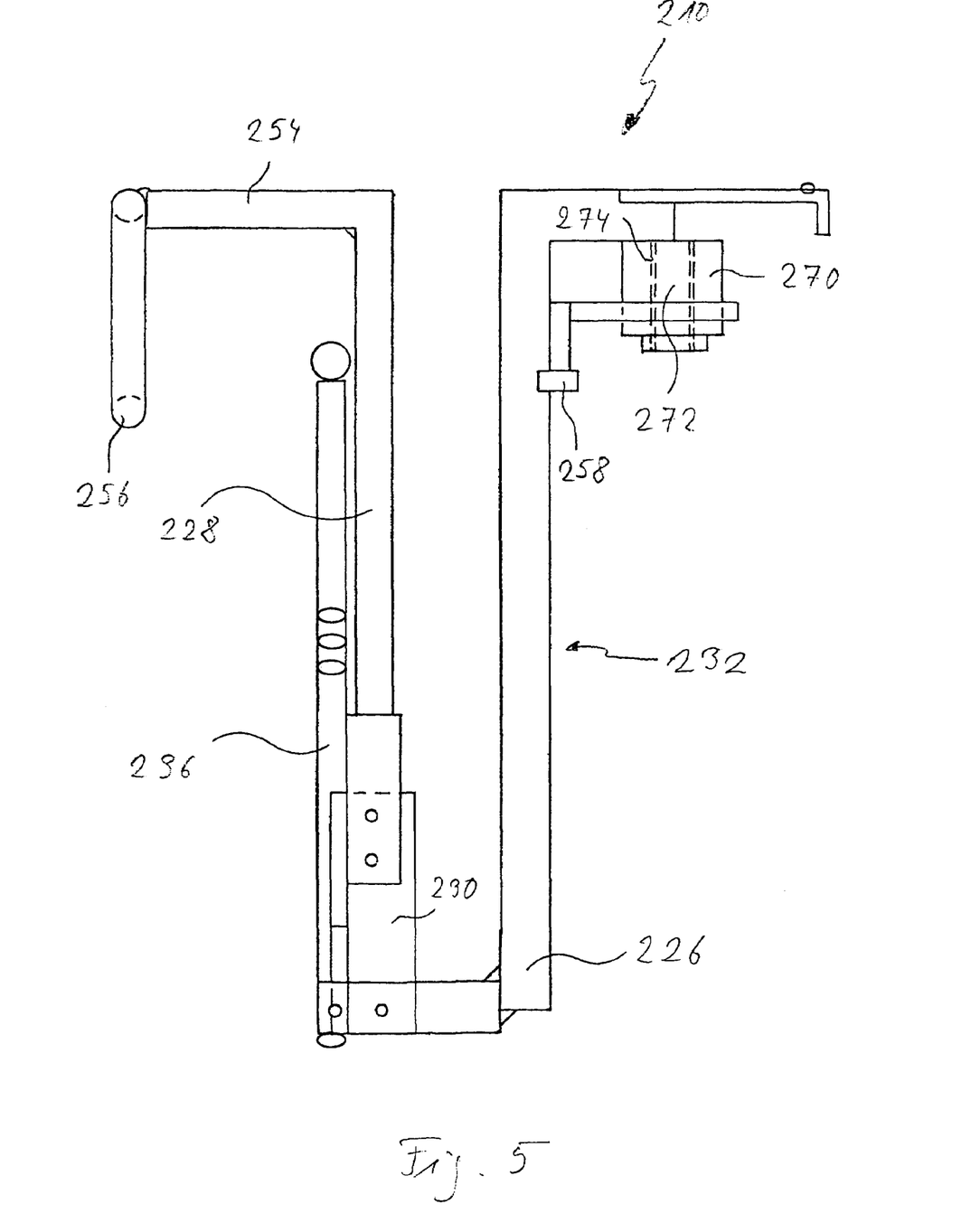
FIG. 5 shows a side view of a door positioner according to the invention according to a third practical example of the invention.
Figure 6:
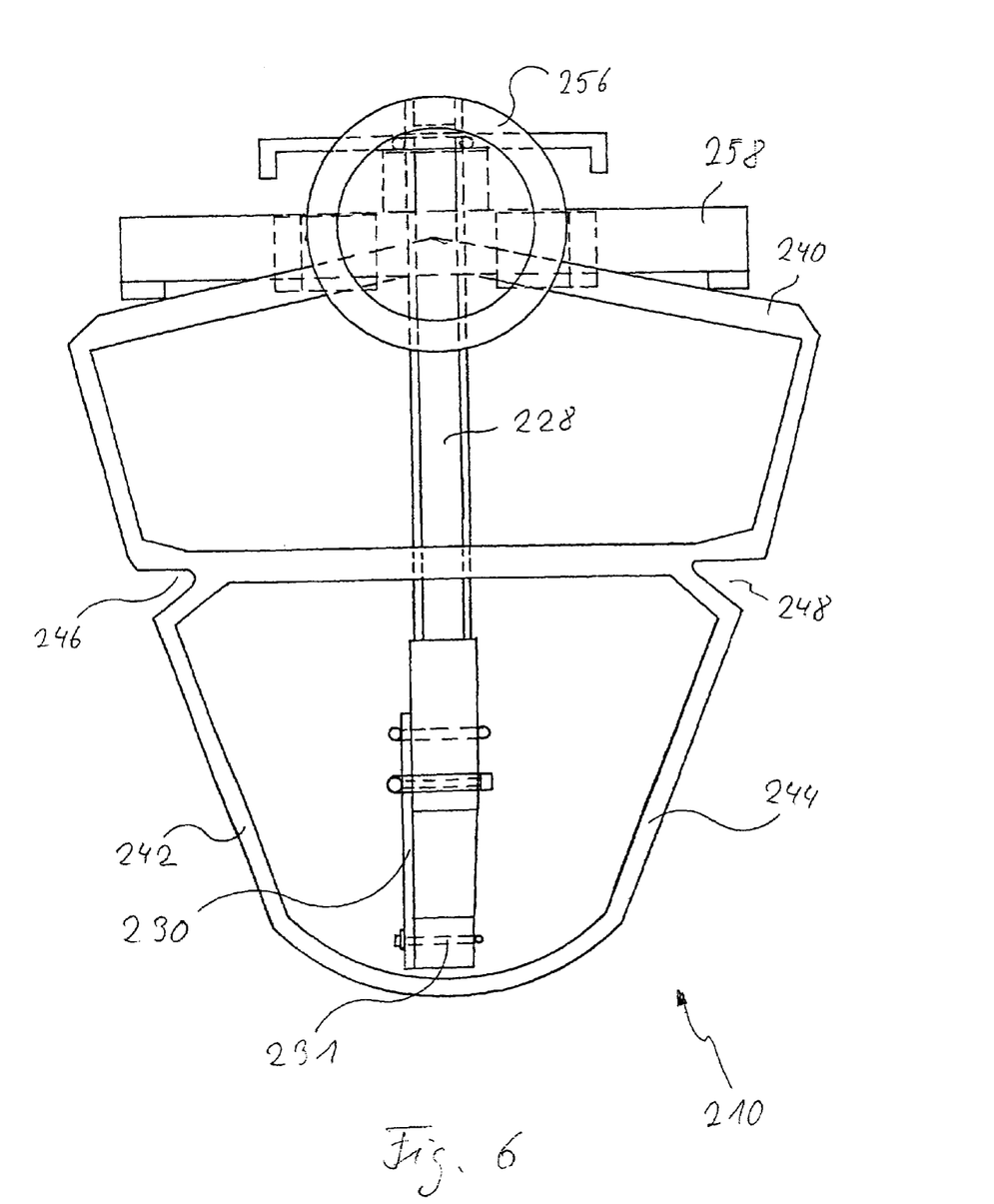
FIG. 6 shows a top view of the door positioner from FIG. 5.

FIGS. 5 and 6 show a third practical example of a door positioner in a side view and top view corresponding to FIGS. 2 and 3. The representations of FIGS. 5 and 6 are not true to scale and contain some drawing errors. Parts that correspond to the door positioner 10 shown in FIG. 1 are designated by reference numbers increased by 200 and are not explained once more individually.

To fasten the door positioner 210 on the side doors 12 a sleeve 270 with a hole 272, which has an inner thread 274, is provided on the first limb 226. The door positioner 210 can thus be screwed on the inner surface of the side door 12 without using a nut.

It is clear from these practical examples that the fastening means with which the door positioner is fastened on the inner surface of the side door 12 have to be matched to their respective design conditions. Both the geometrical shape of the door spar 16 and the way how the door positioner 10 can be fastened to the side door 12 determine the shape and position of the index notches. One and the same door positioner can for this reason not generally be used both for the front and for the rear side doors. Use for another body shell is not generally possible either without at least exchanging the fixing frame or modifying the fastening means.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as de-fined by the appended claims, and equivalents thereof.

The invention claimed is:

1. A positioner for holding open a movable member operatively attached to a vehicle body during a surface treatment of the vehicle body, the positioner comprising:
 a U-shaped bracket, which has a first limb, a second limb and a connecting element connecting the two limbs, the two limbs being deflectable elastically against one another in a shear plane,
 a fastening piece arranged at the free end of the first limb for the detachable fastening of the positioner to an inner surface of the movable member,
 an actuating part arranged at the free end of the second limb for deflecting the second limb relative to the first limb, and
 a fixing means arranged on the second limb between the connecting element and the actuating part for spring locking of the positioner on a movable member spar of the vehicle body.

2. The positioner of claim 1, wherein the actuating part lies in a resting position at least approximately opposite the fastening piece.

3. The positioner of claim 1, wherein the actuating part is a ring.

4. The positioner of claim 3, wherein the ring is arranged in a ring plane, which encloses an angle of less than 25° relative to the shear plane.

5. The positioner of claim 4, wherein the ring plane encloses angles of less than 5° relative to the shear plane.

6. The positioner of claim 1, wherein the two limbs are arranged in their resting position in a plane that runs perpendicular to the shear plane.

7. The positioner of claim 1, wherein in the bracket only the connecting element is elastically bendable.

8. The positioner of claim 1, wherein the fixing means comprises a recess, in which a part of the movable member spar can engage.

9. The positioner of claim 8, wherein on an inner surface of the recess at least one projection is formed such that the part of the movable member spar can touch the at least one projection only at one point or along one line.

10. The positioner of claim 1, wherein a fixed counterpart is arranged on the second limb between the fixing means and the actuating part, wherein said counterpart is deflectable together with the second limb and interacts with a locking element, which is arranged on the first limb and extends outwards in the shear plane from the first limb, in such a way that the movable member spar is clamped in a closed position of the movable member between the locking element and the counterpart.

* * * * *